Patented Jan. 23, 1951

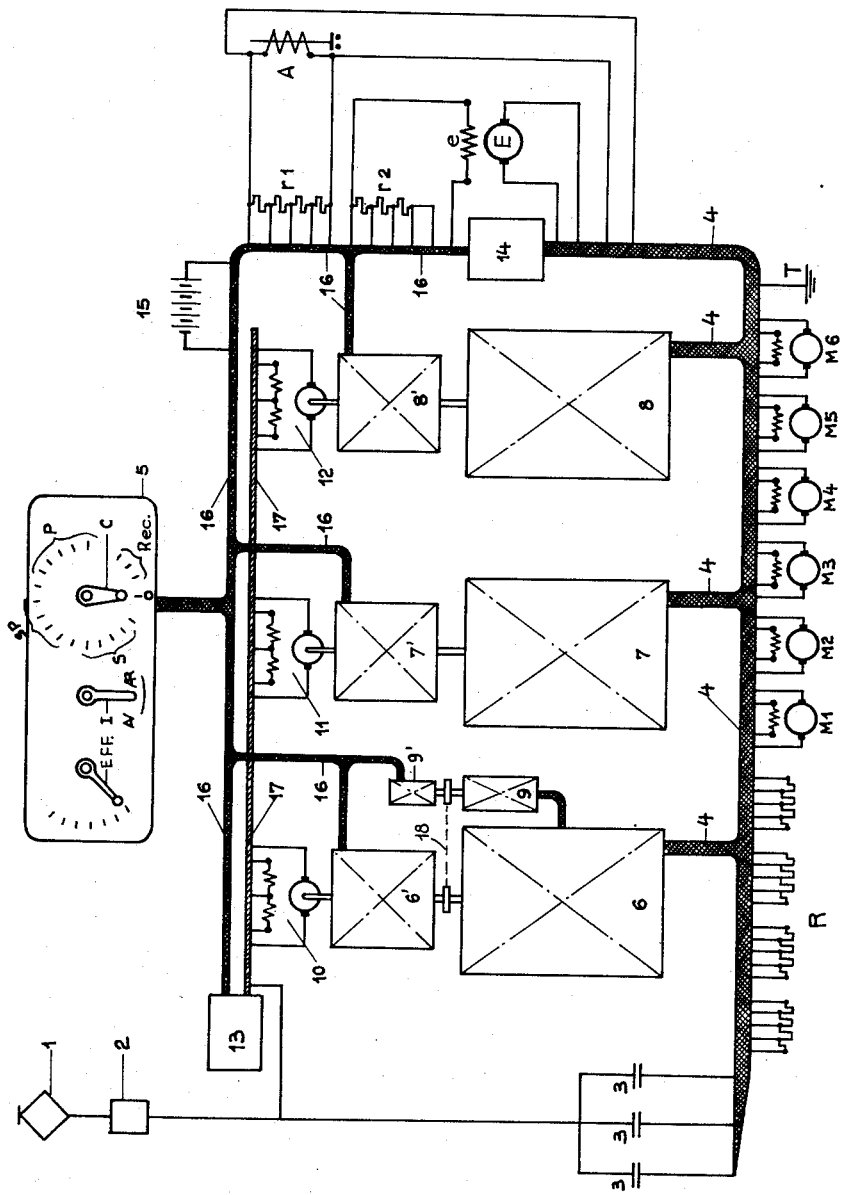

2,538,868

UNITED STATES PATENT OFFICE 2,538,868

AUTOMATIC CONTROL OF ELECTRIC LOCOMOTIVES

Leon Heidmann, Jeumont, France, assignor to Societe Anonyme dite: Forges et Ateliers de Constructions Electriques de Jeumont, Paris, France, a corporation of France Application July 21, 1947, Serial No. 762,428
In France February 25, 1942

Section 1, Public Law 690, August 8, 1946
Patent expires February 25, 1962

4 Claims. (Cl. 318—543)

The present invention relates to the automatic control equipment of electric locomotives and the like as well as to the means of operating the same.

The construction of such automatic equipment presents serious difficulties since it involves a very large number of notches and a plurality of couplings having to correspond to special operative conditions, such as a very smooth variation of the tractive effort, providing numerous various automatic or semi-automatic operating programs and securing safety features involving a large number of different interlockings. On the other hand the control of such automatic locomotive equipment has to be simple, convenient and safe.

It is practically impossible to fulfill without excessive complexity all of these conditions if individual contactors with a single main controller are used, as is generally the case in known electric locomotives.

Automatic equipment having two separate cam-shaft controllers as disclosed in applicant's copending application Ser. Number 762,431, filed July 21, 1947, now Patent 2,524,348, issued October 3, 1950, have been built, but such two-controller arrangements are not flexible enough and do not sufficiently simplify the equipment in the case of very complex operating programs of large and powerful railroad locomotives.

The present invention has for an object to simplify the equipment, to reduce its bulk and cost and to increase its flexibility and adaptability.

Another object of the invention is to provide a new general design of the equipment wherein the contactors of the cam-operated type are grouped and associated according to their respective functions, to form at least three separate main controllers having different functions and driven separately in both directions by individual step-by-step operating pilot-motors.

A further object of the invention is to provide a general lay-out of the main controllers and of the control means associated with them in such a way that a distinct simplifying and an important reduction of volume, weight and cost of the equipment are attained. For example, in conventional locomotive equipment comprising individual and non grouped contactors there are 50 notches obtained with the aid of 62 contactors, that is 0.8 notch per contactor; with two main controllers having each multiple functions there is about one notch per contactor, while in an equipment which has been built according to the present invention, almost two notches per contactor are obtained.

According to a feature of the invention, the main current contactors of the equipment are grouped to form three separate automatically driven main controllers with quite distinct functions, as follows:

Besides a conventional coupling controller for effecting the different couplings of the traction motors, such as series, series-parallel and parallel, and a conventional rheostatic controller acting upon the starting and braking resistances of the traction motors, there is provided a special third main controller for shunting and regenerating, which is adapted to act upon the fields of the traction motors.

Each of the above main controllers comprises, in addition to its main contactors, a plurality of auxiliary interlocking and control fingers and segments forming an auxiliary controller.

The attached drawing is a simplified diagrammatical drawing illustrating one possible construction of the equipment according to the invention.

As shown in the attached diagram, the electric equipment receives current from the pantograph 1 through the general circuit breaker 2 and the main protective contactors 3. A certain number of traction motors $M_1$, $M_2$... cooperate with a plurality of resistances R provided for starting, braking and regulation, and with at least one excitor E provided for regenerative braking.

The main circuit wiring which does not form an object of the present invention, is diagrammatically shown by the cables 4 and will not be described in detail.

The equipment comprises substantially at least one master controller 5, a main coupling controller 6, a main rheostatic controller 7 and a main shunting and regenerating field controller 8, a reverser 9, three individual reversible pilot-motors 10, 11, 12 provided for operating step by step the above main controllers; a set 13 of suitable interlocking and control relays for starting, stopping and reversing the pilot-motors; a set 14 of suitable traction control relays and a source such as a storage battery 15 for energizing the interlocking and control circuits. The advance of the controller 7 is regulated by a conventional acceleration relay of the locomotive mounted at 14.

The handle E$ff$ of the master controller 5 is provided for varying the ampere-turns of this acceleration relay through the intermediary of a control resistance $r_1$ connected in parallel across the relay winding. Another control resistance $r_2$ is provided for regulating the field windings $e$ of the braking exciter E.

The master controller 5 comprises a conventional regulating handle C controlling the notches "S," "SP" and "P" of the various motor couplings and the notches "R$ec$" for regenerative braking; I is a reverse handle and E$ff$ a handle provided for modifying the tractive effort or the braking effort of the motors.

The handle E$ff$ is provided for short-circuiting more or less the resistances $r_1$ and $r_2$, as follows:

When the regulating handle C is in any of its motoring positions S, SP or P, the handle E$ff$ is reducing the value of the rheostat $r_1$ which is interconnected in a known manner with the acceleration relay A to modify the response of this relay, whereby the positive tractive effort of the locomotive is adjusted at will.

When the handle C is in any of its braking positions R$ec$, the above handle E$ff$ is acting upon the value of the field rheostat $r_2$ of the braking exciter E, whereby the negative tractive effort in regenerative braking is adjusted.

Thus, the position of the handle E$ff$ is always determining the torque of the traction motors.

Each of the main controllers comprises two portions: A main portion, which is shown by the lower rectangles 6, 7 and 8, comprises a plurality of contactors, of the mechanical type operated by a cam-shaft which is driven step-by-step in both directions by a corresponding pilot-motor 10, 11 or 12. The other portion, schematically indicated by smaller rectangles 6', 7' or 8' may comprise each an auxiliary drum controller with conventional segments and fingers connected to appropriate control and interlocking circuits.

These auxiliary circuits receiving power from the battery 15 and suitably interconnecting the master controller 5, the auxiliary controllers 6', 7' and 8', the sets of relays 13 and 14 and the field $e$ of the exciter E, are shown diagrammatically by the connection cables 16. The auxiliary circuits provided for controlling the pilot motors 10, 11, and 12—which are assumed to be electrical, but may be of a different type—are schematically shown by the connection cable 17.

The reverser 9 which also comprises an auxiliary drum D' for the interlocking circuits, is shown as being mechanically controlled by the coupling controller 6. For this purpose there is provided such a mechanical connection that if the controller 6 rotates in the normal (or forword) direction, the reverser 9 remains immovable, and to operate the reverser, the controller 6 has to effect one or more steps in the reverse direction.

The mechanical arrangement of the described equipment in a locomotive body may correspond for instance to my copending application No. 760,881, filed July 14, 1947, which shows a general lay-out of the three main controllers, their respective pilot-motors, the master controllers, the rheostats, the reverser, etc.

As to the detailed arrangement and interconnection of the auxiliary circuits 16 and 17 and the groups of relays 13 and 14, they are not the object of the present invention and will depend upon the desired operation program of the locomotive.

Whatever these details may be, it will be understood that by provision of three separately and automatically driven main controllers for distinct functions, which are specialized as described above, instead of two controllers as usual, a much greater variety of combined step-by-step operations can be obtained, whereby the flexibility and adaptability of the locomotive are substantially improved.

On the other hand, the practical experience has shown that in spite of the increased number of main controllers, the equipment is substantially simplified.

This simplification is due not only to the reduction of the total number of main contactors as stated above. It is obvious that by using three independent and suitably specialized controllers instead of only two, a much greater number of different combined operations can be obtained; all necessary operations are thus effected merely by those controllers, without any additional apparatus, such as switches, separate contactors, auxiliary drums and other heavy current devices which are generally used in electric locomotives.

Thereby the overall size, weight and cost of the new equipment are substantially reduced.

I claim:

1. In an automatic control equipment for electric locomotives having a master controller, a reverser and cam-operated contactors provided for motor coupling, rheostatic control and field control, means for reducing the number of said contactors, simplifying the equipment and improving its flexibility, comprising three main controllers formed by grouping of all said contactors, the first including all said motor coupling contactors, the second all said rheostatic control contactors and the third is formed by all said field control contactors, the said reverser having the form of a drum adapted to be driven by repeated return movements of said first main controller.

2. In an automatic control equipment according to claim 1 auxiliary drum controllers mechanically associated with each of said three main controllers and with said reverser and interconnected with the control and interlocking circuits of the locomotive.

3. In an automatic control equipment for electric locomotives having a master controller, a conventional braking exciter, a braking control resistance inserted into the field circuit of said exciter and three separate main controllers driven by pilot-motors, means for controlling in regenerative braking the negative tractive effort of the locomotive, comprising upon said master controller, a regulating handle with starting, shunting and braking notches, a reverse handle and a special tractive effort handle for modifying in braking the value of said braking control resistance, whereby the negative tractive effort is separately adjusted.

4. In an automatic control equipment according to claim 3, means for separately controlling in motoring the positive tractive effort of the locomotive, comprising a conventional acceleration relay and an additional adjustable control resistance connected in parallel across the relay coil for modifying the response of said relay, said additional resistance being adapted to be controlled by said tractive effort handle upon said master controller.

LEON HEIDMANN.

REFERENCES CITED

The following references are of record in the file of this patent:

UNITED STATES PATENTS

| Number | Name | Date |
| --- | --- | --- |
| 617,601 | Potter | Jan. 10, 1899 |
| 618,054 | Case | Jan. 24, 1899 |
| 1,291,583 | Martis et al. | Jan. 14, 1919 |
| 1,365,317 | Hall | Jan. 11, 1921 |
| 2,041,580 | Tritle | May 19, 1936 |
| 2,318,331 | Purifoy | May 4, 1943 |